United States Patent

[11] 3,632,386

| [72] | Inventor | Alan R. Hurst<br>Hinsdale, Ill. |
|---|---|---|
| [21] | Appl. No. | 819,921 |
| [22] | Filed | Apr. 28, 1969 |
| [45] | Patented | Jan. 4, 1972 |
| [73] | Assignee | Arhco, Inc.<br>Continuation-in-part of application Ser. No. 772,118, Oct. 31, 1968, now Patent No. 3,518,158, and a continuation-in-part of 815,952, Apr. 14, 1969, now Patent No. 3,509,991. This application Apr. 28, 1969, Ser. No. 819,921 |

[54] TREATED SILICONE SURFACE
19 Claims, 3 Drawing Figs.

[52] U.S. Cl..................................................... 117/46 FC,
117/46 R, 117/93.1, 117/122 P, 117/122 PS
[51] Int. Cl....................................................... B44d 1/44
[50] Field of Search........................................... 117/46 R,
46 FC, 68, 76 P, 118, 122 P, 122 PS, 122 PA, 93.1
R, 93 CD; 161/208, 250

[56] References Cited
UNITED STATES PATENTS

| 3,403,045 | 9/1968 | Erickson et al............... | 117/76 X |
|---|---|---|---|
| | | FOREIGN PATENTS | |
| 751,991 | 7/1956 | Great Britain................ | 117/93.1 |

*Primary Examiner*—Alfred L. Leavitt
*Assistant Examiner*—Caleb Weston
*Attorney*—Hofgren, Wegner, Allen, Stellman & McCord ABSTRACT: A silicone polymer release surface is corona treated to decrease its release properties. The corona treatment results in change of the molecular structure of the silicone polymer at the surface and the surface can then be coated with a pressure sensitive adhesive before the silicone molecules are permitted to completely realign to their original structure. The adhesive blocks realignment and can be applied immediately after corona treatment by in line processing or after the lapse of a sufficient period of time to permit the molecules to realign to the extent providing the particular desired release properties. Alternatively, the corona treatment can be controlled to give the desired release properties and the adhesive can be immediately applied.

INVENTOR.
ALAN R. HURST

ATTORNEYS.

TREATED SILICONE SURFACE

CROSS-REFERENCE TO RELATED APPLICATIONS

This application is a continuation-in-part of my applications Ser. No. 772,118 filed Oct. 31, 1968 and entitled "Release Sheet or Web Having A Printable Surface," now U.S. Pat. No. 3,518,158 and Ser. No. 815,952 filed Apr. 14, 1969 and entitled "Release Sheet and Adhesive Structure Embodying the same," now U.S. Pat. No. 3,509,991

STATEMENT OF THE PRIOR ART

1. Field of the Invention

This invention relates to silicone polymer release surfaces and structure and more particularly to a method for decreasing the release properties of such silicone polymer surfaces.

2. Description of the Prior Art

As set forth in my above-identified copending patent applications, there have previously been provided release sheets or webs having silicone coated surfaces. Additionally, as pointed out in my U.S. Pat. No. 3,509,991, I have provided a release sheet employing a polyethylene and paper combination with a silicone release coating on both sides which results in a differential release paper. Silicone polymers are excellent release materials and at times they provide greater release properties than are really desired for particular structure.

SUMMARY OF THE INVENTION

I have discovered that by subjecting a silicone polymer release surface to "oxidative" treatment, e.g., electric discharge (corona) or flame treatment, the release properties of the surface are reduced, e.g., made more difficult. The amount of reduction depends on the amount of corona treatment so that the release properties can be reduced to almost any desired level. Further, the release properties can be held at the reduced desired level by applying a pressure sensitive adhesive to the surface. The oxidative treatment apparently disrupts the molecular structure of the silicon polymer surface but the molecular structure of silicone polymers has excellent memory properties and tends to realign back to its original structure sometimes within only a few days after oxidative treatment. However, the application of a pressure-sensitive adhesive to the surface holds the molecules in their disrupted condition and prevents realignment.

By my method I have also provided new and useful silicone release surfaces having reduced release values and I have provided composite pressure sensitive adhesive structures in which the adhesive covers the treated surface.

While this invention is susceptible of embodiment in many different forms there are found in the drawings and will herein be described in detail specific embodiments of the invention with the understanding that the present disclosure is to be considered as an exemplification of the principles of the invention and it is not intended to limit the invention to the embodiments illustrated.

DESCRIPTION OF THE PREFERRED EMBODIMENTS

During development of my invention, as noted above, I discovered that oxidative treatment would decrease the release values of a silicone polymer surface but that these release values would return to normal very quickly compared with other oxidatively treated surfaces such as polyethylene. For example, a silicone-coated material having a release value of 30 grams per inch from a standard heat activated pressure sensitive tape after corona treatment may have a release value as high as 400 grams per inch but this can decrease to 200 grams per inch after storage for one day and during the second day it may be down to its original 30 grams per inch. Tests were conducted by exposing the tape in contact with the release surface to 350° F. for 10 minutes. This was then cooled to room temperature and the tape removed on a Keil Tester, which is an industry standard spring operated dial type tester permitting the stress of removal to be read in grams per inch. This indicates excellent memory of the silicone polymer for its original molecular structure. It also permits adjustment of release values to a particular value within a wide range. This can be done by corona treating at a high level and waiting until the surface has the desired release property and then coating with adhesive to stop further realignment of the molecular structure. Additionally, it has been found that the reduction in release value is generally proportionate to the intensity of corona treatment, i.e., the power applied per square foot so that the initial release value obtained by corona treatment can be a preselected value and the corona treatment step can be controlled to achieve that value. This has been found to be a more advantageous way of providing a preselected or predetermined value because the adhesive can be applied immediately in line to retain the release value. Further, a release web having silicone release surfaces on both sides can be corona treated to differing extents to provide differential release between the two sides.

Figure 1:
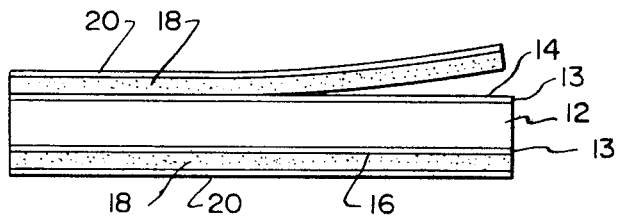
FIG. 1 is an enlarged section through a preferred embodiment of a release sheet of this invention showing a mass of adhesive on each release surface of the sheet.

Turning now to the drawings, FIG. 1 shows a release sheet of the type described in my U.S. Pat. No. 3,518,158 which includes a paper substrate 12 having polyethylene layers 13 extruded to both sides of substrate 12. Each polyethylene layer 13 has a silicone coating 14 or 16 and a pressure sensitive adhesive 18 mass is usually applied to the release surface 16 having the more difficult or lower release properties. Adhesive 18 can have a backing 20, although normally it will be unbacked. Release surface 16 has been corona treated whereas release surface 14 is either untreated or has been corona treated to a lesser extent than surface 16. It requires greater pull to remove the adhesive 18 from surface 16 than from surface 14. In some uses, an adhesive mass 18 can be applied to both sides of the release sheet as shown in FIG. 1 to be released under different pressure conditions.

Figure 2:
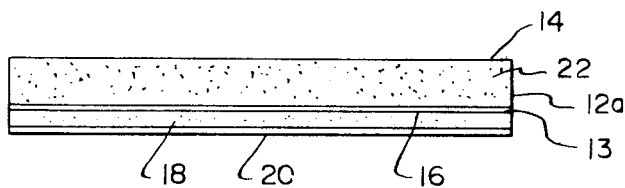
FIG. 2 is an enlarged section similar to FIG. 1 showing another release sheet and adhesive composite.

FIG. 2 illustrates a structure in which the release sheet comprises a layer of absorptive paper 12a having absorbed therein silicone polymer indicated by stripping 22 in accordance with my U.S. Pat. No. 3,509,991. In both of the structures of FIGS. 1 and 2, the silicone polymer is cured using the normal curing catalyst and normal curing conditions as recommended by the manufacturer of the silicon material. Again, in FIG. 2, silicone surface 16 has been corona treated, while surface 14 is either untreated or has been corona treated to a lesser extent so that its release value is higher than that of surface 16. Of course, both surfaces can be corona treated to the same extent to provide similar release values if desired.

Figure 3:
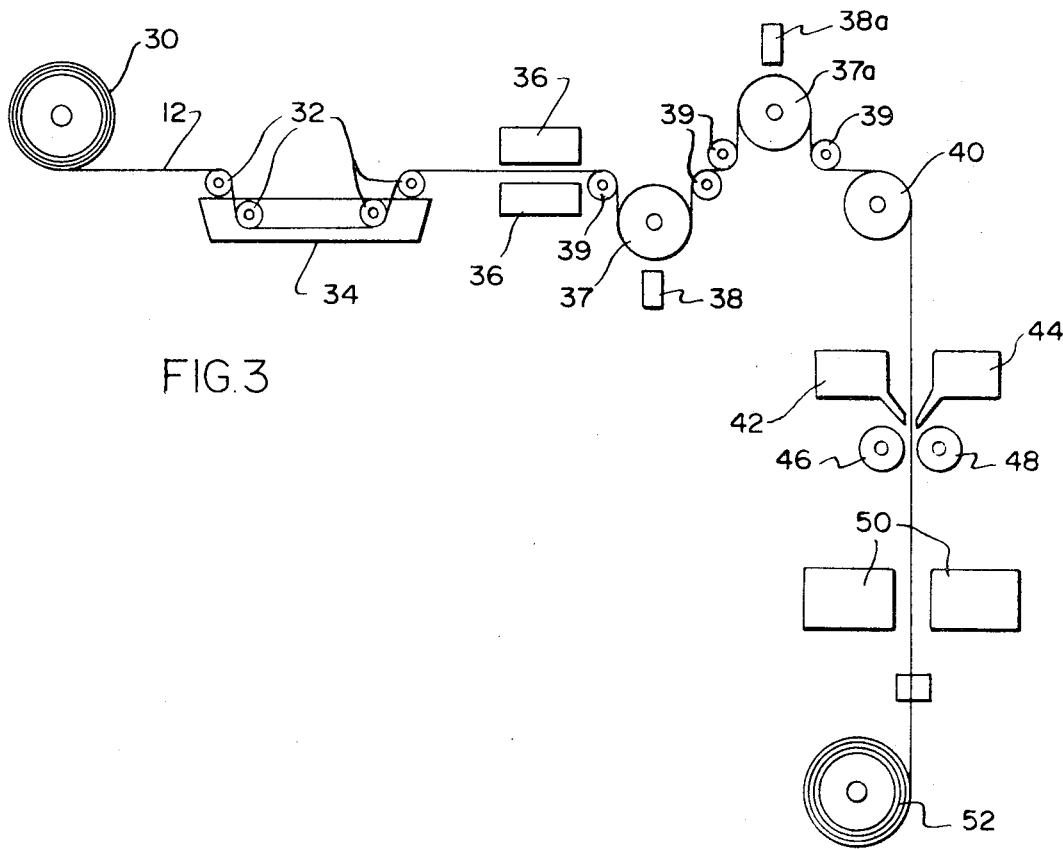
FIG. 3 is a flow diagram of a method for producing release sheets and composites such as shown in FIGS. 1 and 2.

Turning now to FIG. 3, release webs can be prepared by delivering the substrate 30 in roll form which is either paper layer 12 having two polyethylene coated surfaces 13 or is a paper layer 12a, which can be absorptive paper, having one polyethylene coated surface 13, through a tank 34 containing a solution of the silicon polymer. Suitable guide rollers 32 are provided for directing the web through the tank and immersing it in the solution. The web is then delivered through a curing oven 36 where the polymer is cured and the web then proceeds via guide rolls 39 through a corona discharge station where either or both sides of the web can be corona treated, as desired. The corona discharge treating station includes two corona treating devices 38 and 38a so that either or both sides of the web can be treated as desired. A dielectric roll 37 or 37a backs the reverse side of the web during corona treatment by each of devices 38 and 38a to exclude air from the reverse side and assure that the reverse side will not also become significantly corona treated. Thus either or both of devices 38 and 38a can be used to selectively corona treat either or both sides of the web.

The web is then directed over drum 40 and between adhesive applicator stations 42 and 44. As the web passes between drums 46 and 48, the amount of pressure sensitive adhesive applied by applicators 42 and 44 can be controlled on either or both sides the web. The web then proceeds through station 50 where the pressure sensitive adhesive can be dried by solvent removal, if this is necessary, i.e., if a vaporizable solvent type adhesive has been used. The web can then be cut to desired length, e.g., to form labels and the like, or can be delivered to a takeup reel 52. The takeup reel 52 is usually used where only one side of the web has been coated with pressure sensitive adhesive, i.e., the side to which applicator 44 applies the adhesive in the form illustrated. Where both sides are coated and it is desired to wind the web on a takeup reel, another release web would usually be delivered into the material as it is being wound up to cover one side of the pressure sensitive adhesive to keep the two adhesive masses from merging.

The substrate to which the silicone polymer release agent is applied can be any of the usual release sheet substrates, e.g., nonabsorbent paper such as kraft paper, flexible plastic film, glassine, etc. Absorbent paper can also be used and can be "saturated" with the silicone polymer release agent. The preferred substrate is a paper-plastic film laminate having plastic film, e.g., polyolefin film and especially polyethylene film applied to both surfaces of the paper. Usually, such laminated structures are produced by priming both paper surfaces with a primer for creating active adhesion sites and extruding polyethylene or other thermoplastic material as films on the surfaces by known processes.

The silicon polymer release agents are well known in the art. Any curable silicone polymer release agent can be used. Because the release agents are easy to apply as solutions, the soluble liquid and solid curable silicone rubber polymers are preferred. Usually, the silicone polymer release agents are polymers which are believed to have the following formula:

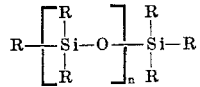

wherein the R's represent monovalent organic radicals, usually hydrocarbon and often selected from the group consisting of methyl and phenyl groups, and $n$ is an integer denoting average molecular weight of the polymer. Such polymers can be cured using various curing agents and at various temperatures as specified by manufacturers. Such polymers have very low release values (high release properties) and it has been found that the corona treatment reduces release properties from a value less than 40 to a value greater than 50 or 100 for many adhesives via the Keil tester.

The corona treatment or flame oxidation is at an intensity and for a time sufficient to reduce the release property of the coating the desired amount. Corona or other electrical discharge treatment and flame oxidation can be carried out as previously known in the art, e.g., see Gilbert et al., U.S. Pat. No. 3,111,418. In treating the silicone surfaces by electrical discharge in accordance with the present invention, the amount of electrical energy is not critical and a field of between 10 and 10,000 volts, or higher or lower, can be established between the treating electrodes across the area to be treated. The electrical discharge or flame treatment is generally considered to have an oxidizing effect on polymers and in the case of silicone polymers, there is some definite electrical change which reverts on standing under ambient conditions.

The following examples are offered as further illustrations of the invention and are not intended as limitations on the invention.

EXAMPLE 1

A laminate substrate of 20 lb. natural kraft paper, coated on both sides with extruded polyethylene film, was coated on both polyethylene surfaces with a solution of SYL-OFF 23 Paper Coating and was solvent-evaporated and cured in an oven at a temperature of 350° F. for one to two minutes to provide a release sheet. SYL-OFF 23 Paper Coating is a solution of curable silicone rubber polymer in xylene and has a silicone content of about 30 weight percent. The coating solution used was SYL-OFF 23 Paper Coating cut back with toluene to about 5 percent solids content. About 6 weight percent of dibutyl tin di-2-ethyl hexanoate, based on silicone polymer, was added as curing catalyst as recommended by the manufacturer. One side of the sheet was corona treated and a resinous pressure-sensitive adhesive (17-K marketed by Girder Division of United Shoe Machinery) was coated on the corona-treated surface immediately after corona treatment. The adhesive surface was applied to a substrate and the initial release value of the release sheet was 100 to 300 grams per inch as tested on a Keil Tester. The "initial release value" is the value obtained immediately after the adhesive is applied. Before corona treatment, the Keil release value was less than 50 grams per inch.

EXAMPLE 2

Example 1 was repeated except that the pressure-sensitive adhesive was not applied immediately but was applied after a lapse of one day after corona treatment. The initial release value was 80 to 90 grams per inch.

EXAMPLES 3 THROUGH 5

A series of three release sheets were prepared as in example 1 and were corona treated for the same length of time at the following voltages:

| Example No. | Voltages |
| --- | --- |
| 3 | 35 |
| 4 | 85 |
| 5 | 160 |

An acrylic-type pressure-sensitive adhesive (44-K marketed by Girder Division of United Shoe Machinery) was immediately applied and the initial release value was determined on the Keil Tester. Examples 3, 4 and 5 had initial release values of 50 grams per inch, 90 grams per inch and 400 grams per inch, respectively, showing increased release values (lower release properties) with increased intensity of corona treatment.

EXAMPLES 6 THROUGH 8

The procedure of examples 3 through 5 was repeated except that corona treatment was in a configuration resulting in a lower degree of treatment for each applied voltage. The applied voltages and release values were as follows:

| Example No. | Applied Voltage | Release Value |
| --- | --- | --- |
| 6 | 35 | 30 grams per inch |
| 7 | 85 | 40 to 44 grams per inch |
| 8 | 160 | 58 to 60 grams per inch |

EXAMPLES 9 AND 10

In order to show the effect of exposure time of the silicone surface to corona discharge, in each of examples 9 and 10 a web of the release sheet described in example 1 was passed through a corona treater and immediately coated with acrylic pressure-sensitive adhesive on the treated surface. The corona treatment was at 85 volts in both examples. The web rates and release values were as follows:

| Example No. | Web Rate | Release Values |
| --- | --- | --- |
| 9 | 50 ft. per minute | 90 grams per inch |
| 10 | 100 ft. per minute | 75 to 80 grams per |

It is apparent that I have provided a release sheet and method of making the release sheet in which release surfaces can be provided with predetermined or preselected release properties, if desired. After the predetermined release value has been provided on the release surface, the release sheet is stabilized during storage by application thereto of a removable layer preventing contact of oxygen with the surface. In the preferred form, the removable layer is an air-impermeable layer of pressure-sensitive adhesive. The release sheets are able to accommodate variations in adhesive compositions, in speed of adhesive removal, in angle of separation from the sensitive and in use and storage temperatures, as well as variations in mechanics of removal of the release sheet from the adhesive mass, e.g., smooth to jerky intermittent removal.

The present invention also has the advantage of providing a tacky adhesive mass on a release structure in roll form. The roll can be unwound with the adhesive adhering to the release sheet and the exposed adhesive surface can then be applied to an object or surface followed by sealing off of the backing material leaving a mass of adhesive on the object. Uses for such adhesive, including joining objects together, uses as a caulking or sealing compound, and the like, are described in my above-mentioned U.S. Pat. No. 3,509,991.

The usual additives can be included in adhesives used in the present invention, e.g., pigments, fillers, stabilized antioxidants, etc. All percentages given herein are by weight unless otherwise indicated.

I claim:

1. A method of reducing the release characteristics of a silicone polymer release surface on a release sheet to a predetermined desired level which method comprises: subjecting the surface to oxidative treatment selected from the class consisting of electrical discharge treatment and flame treatment until the release properties are reduced and then protecting the treated surface against loss of reduced release properties before realignment of the surface molecular structure to its original condition and at a time when the release properties are at said level.

2. The method of producing a pressure-sensitive adhesive on a release backing which comprises the method of claim 1 wherein the protecting step comprises applying a pressure-sensitive adhesive to the treated surface to hold the silicone polymer molecules against substantial realignment.

3. The method of claim 2 wherein the applying step immediately follows the treating step before the treated surface is permitted to return appreciably toward its original molecular structure.

4. The method of claim 3 wherein the release surface is the surface of a moving web and the applying step follows the subjecting step in-line.

5. The method of claim 1 in which the release surface is the surface of a flexible laminate web of plastic film on both sides of a sheet of paper.

6. The method of claim 5 in which both surfaces of the web have silicone polymer release coatings forming release surfaces and in which both surfaces are subjected to the oxidative treatment.

7. The method of claim 1 wherein said silicone polymer is a cured silicone rubber polymer.

8. A method of reducing the release characteristics of a silicone polymer release surface which method comprises subjecting the surface to oxidation treatment selected from the class consisting of electrical discharge treatment and flame treatment until the release properties are reduced, permitting the treated surface to return partially to its original molecular state to provide a preselected release value and then applying a pressure sensitive adhesive to the treated surface to hold the silicone polymer molecules against substantial further realignment.

9. A method of reducing the release characteristics of a silicone polymer release surface on a release sheet to a predetermined desired level which method comprises: subjecting the surface to flame treatment until the release properties are reduced and then protecting the treated surface against loss of reduced release properties before realignment of the surface molecular structure to its original condition and at a time when the release properties are at said level.

10. A method of reducing the release characteristics of a silicone polymer release surface on a release sheet to a predetermined desired level which method comprises: subjecting the surface to corona treatment until the release properties are reduced and then protecting the treated surface against loss of reduced release properties before realignment of the surface molecular structure to its original condition and at a time when the release properties are at said level.

11. The method of claim 10 wherein the electrical discharge is corona discharge establishing a field of between 10 and 1,000 volts across the surface being treated.

12. The method of claim 11 wherein the surface is the surface of a web traveling through a corona discharge station and then through an in-line pressure-sensitive adhesive application station and including the steps of varying the web speed or discharge voltage to control the electrical discharge per square foot received by the surface and thereby control the amount of reduction in release properties to the desired level for receiving the adhesive at the application station to adhere at a preselected increased bond strength compared with adherence to an untreated silicone polymer surface.

13. As an article of manufacture a release sheet with a polyolefin layer having a corona-treated silicone polymer surface on said layer and a protective coating on said surface and holding the silicone polymer of said surface against molecular realignment.

14. The article of claim 13 wherein said coating is a pressure-sensitive adhesive.

15. The article of claim 14 wherein the silicon polymer surface comprises a silicone polymer coating on a substrate and wherein the substrate is polyolefin coated paper.

16. The article of claim 15 wherein the paper is coated with plastic on both sides.

17. The articles of claim 16 wherein both plastic coatings are polyethylene.

18. The article of claim 13 wherein said polyolefin is polyethylene.

19. As an article of manufacture a release sheet with a polyolefin layer having a flame-treated silicone polymer surface on said layer and a protective coating on said surface and holding the silicone polymer of said surface against molecular realignment.

* * * * *